United States Patent [19]

So et al.

[11] Patent Number: 5,224,355
[45] Date of Patent: Jul. 6, 1993

[54] PLURAL TEMPERATURE ADJUSTMENT APPARATUS FOR REFRIGERATOR

[75] Inventors: Jae-Hyoung So; Seong-Seob Kim, both of Suwon-shi, Rep. of Korea

[73] Assignee: Samsung Electronics Co., Ltd., Suweon City, Rep. of Korea

[21] Appl. No.: 862,609

[22] Filed: Apr. 1, 1992

[30] Foreign Application Priority Data

Apr. 1, 1991 [KR] Rep. of Korea .................. 91-5244

[51] Int. Cl.$^5$ ............................................. F25B 1/00
[52] U.S. Cl. ........................................ 62/229; 62/231
[58] Field of Search ............... 62/231, 131, 126, 224

[56] References Cited

U.S. PATENT DOCUMENTS 4,835,520  5/1989  Aiello ................................ 62/131

FOREIGN PATENT DOCUMENTS 0062313  10/1982  European Pat. Off. ............ 62/131
64-33485  2/1989  Japan .

Primary Examiner—William E. Wayner
Attorney, Agent, or Firm—Burns, Doane, Swecker & Mathis

[57] ABSTRACT

The present invention relates to a plural temperature adjustment apparatus for a refrigerator whereby adequate cooling grades are automatically changed based on the temperature changes inside a refrigerator and driving time, and more particularly to a plural temperature adjustment apparatus for a refrigerator whereby prolonged of life time of a compressor, reduction of electric power consumption by way of the control of frequent intermittency of a compressor and the effect of temperature adjustment by timer operation even during blackout can be achieved by adequate control of the present temperatures in a refrigerator detected by a temperature detecting part and appropriate control of compressor drivings based on door open/close status detected at a door open/close detecting part and driving time by a timer when temperatures and driving time according to respective cooling grades randomly set up by the user thru the operation part are inputted into a micro computer.

13 Claims, 2 Drawing Sheets

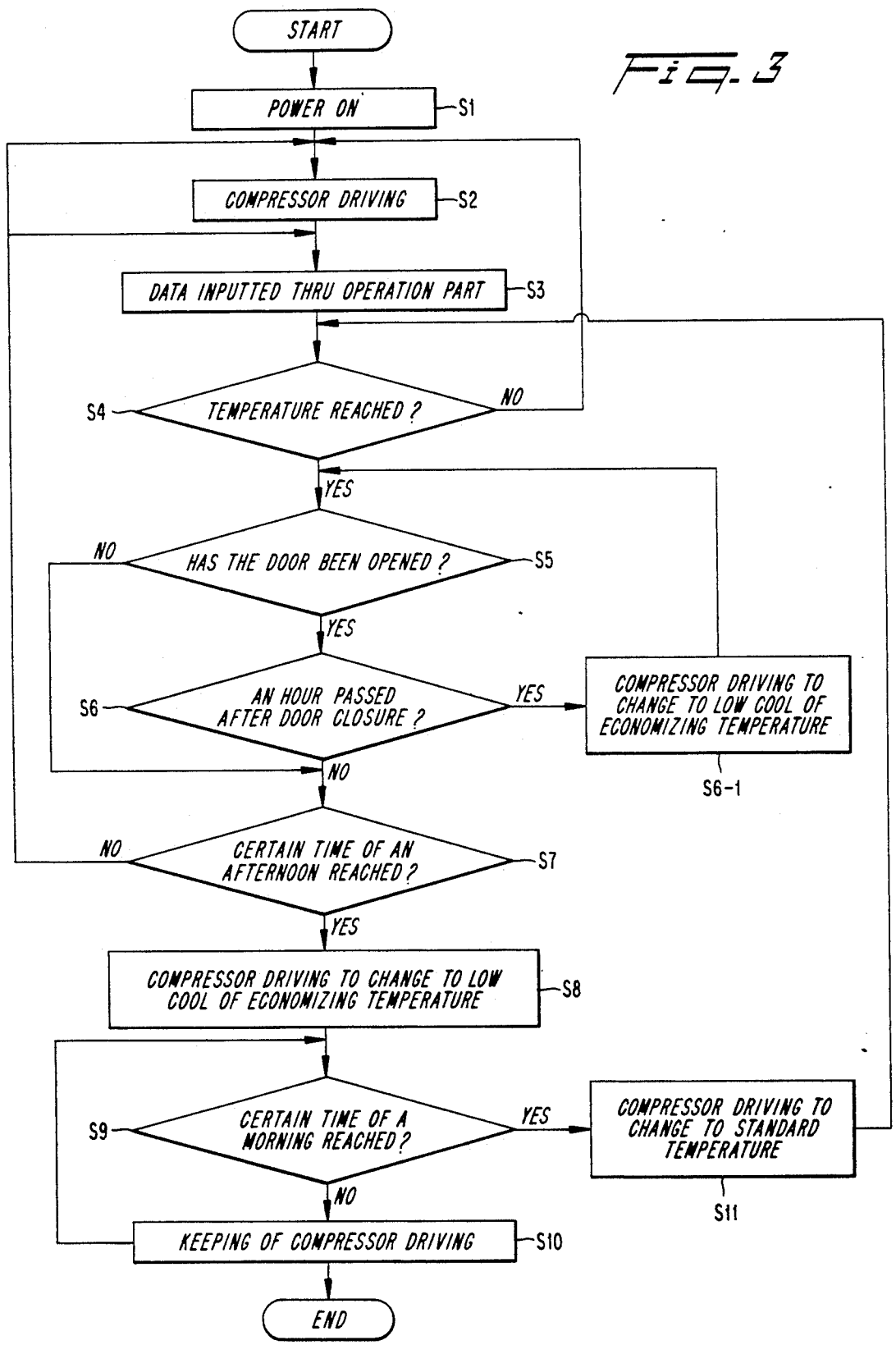

PLURAL TEMPERATURE ADJUSTMENT APPARATUS FOR REFRIGERATOR

FIELDS OF THE INDUSTRIAL USE

The present invention relates to a plural temperature adjustment apparatus for a refrigerator whereby adequate temperature preservation in a refrigerating and a freezing chamber (hereinafter called as refrigerator) control of consumption of electricity as well as effective operation of compressor can be obtained by the automatic switching of the refrigerator to an adequate cooling mode according to the temperature changes in a refrigerator and time elapses.

DESCRIPTION OF THE PRIOR ART

The conventional temperature adjustment apparatus of a refrigerator consists of three steps (grades) i.e., a high, medium and low cool position.

Under these temperature distinction methods, the user usually sets the operating condition of a refrigerator at a medium-cool position as a standard mode or a low-cool position as an electricity economization mode except for the special cases of using a high-cool position.

The user, under said temperature distinction methods, has to set the temperature condition by a manual switching method according to the requirements.

Of course, this manual switching method can adjust temperatures in a refrigerator but when the cool air discharge is enormous due to frequent opening and closing of the refrigerator door under the low-cool temperature condition of the electricity economization mode, it is necessary to change the mode to the standard medium-cool position.

Similarly, in the small hours when opening and closing of the door is almost nil, it is necessary to change the mode to low-cool position as a way of saving electric power.

For example, in order to solve this kind of discrepancy, in Japanese laid open patent No. Sho 64-33485, a fan motor control method is disclosed.

Namely, in the fan motor control method, control is achieved in such a manner that control of the revolution speed of the fan motor is provided in connection with temperature changes in a refrigerator, comprising:

a door open/close detecting circuit which checks opening and closing of refrigerator doors;

a temperature setter which sets inner temperatures of a refrigerator; and a detecting circuit of the inner temperatures in a refrigerator which detects the inner temperatures of a refrigerator.

A control circuit comprises a micro computer performing:

operations, stoppages and control of a compressor according to the difference signals of predetermined temperatures detected by the inner temperature detecting circuit;

control of revolutions of the fan motor for cool air circulation;

stoppages of the fan motor according to refrigerator door open/close signals coming from the door open/close detecting circuit; and control of the fan motor by the revolution speed according to the temperature difference in the case of refrigerator door open/close signals being inputted.

A compressor driving circuit is provided which controls the drive of a compressor.

A fan motor driving circuit is provided which controls the drive of a fan motor revolution speed according to temperature changes.

However, though the conventional fan motor control method has an advantage of maintaining adequate temperatures in a refrigerator by control of fan motor revolution speed and stable re-start of the a refrigerator in a low speed of revolution, the disadvantages of above-mentioned changing of cool grades by the user upon every need and causing possible spoilage of food or excessive load to the machineries inside the refrigerator can arise if no adequate and swift measures in response to the cool grade changes are taken.

For instance, if a refrigerator is used for 24 hours under medium cool position as a standard mode, the compressor keeps driving even in the small hours when there is little changes of inner temperature and low frequency of refrigerator door openings and closings.

Namely, if the temperature range of 0° C-1° C. is considered as a medium-cool grade, the compressor is operated immediately when the temperature is out of this temperature range which causes frequent driving of the compressor. The frequency intermittent operation of the compressor causes more consumption of electic power than is necessay.

In other words, problems have existed involving unnecessary power consumption and infliction of no less influence on compressor life due to frequent intermittent operation of the compressor.

SUMMARY OF THE INVENTION

Accordingly, it is an object of the present invention to provide an improvement of the conventional problems in a refrigerator, and more particularly, to provide a plural temperature adjustment apparatus of a refrigerator whereby the user can set up at will the plural cooling temperatures and time of switching to other temperature modes according to respective cool grades, which causes adequate operation of a refrigerator to be achieved by the control of the compressor in accordance with timer operation.

It is another object of the present invention to provide a plural temperature adjustment apparatus of a refrigerator whereby cool grades are automatically changed according to the lapse of a certain time after the refrigerator door is opened or closed.

It is further object of the present invention to provide a plural temperature adjustment apparatus of a refrigerator whereby a timer is caused to operate during blackout by way of a charging apparatus.

In order to achieve said these objects, the plural temperature adjustment apparatus of a refrigerator in accordance with the present invention is composed of:

a micro computer;

an operation part for inputting necessary temperatures and time into said micro computer according to the cool grades;

a timer for inputting the lapse of certain times in the morning and afternoon into said micro computer by counting 24 hours of a day;

a temperature detecting part for inputting temperature changes being detected over a certain period of time in a refrigerator into said micro computer;

a door open/close detecting part for inputting detected signals of whether a refrigerator door is opened or closed into said micro computer:

a compressor designed to be driven for maintaining the pre-set temperatures set by said operation part if the temperatures in a refrigerator detected by said temperature detecting part are above certain temperatures.

It is a still further object of the present invention to provide in addition to the above an indicating part for indicating detected refrigerator temperatures detected by said temperature detecting part in accordance with micro computer control and a charging part for performing charging operations for a timer which automatically controls temperatures in a refrigerator during a blackout. For better understanding of the nature and objects of the invention, reference should be made to the following detailed description taken in connection with embodiments of the present invention.

BRIEF DESCRIPTION OF THE DRAWINGS

FIG. 3 depicts flow chart showing the operational procedures of refrigerator in accordance with the present invention.

DETAILED DESCRIPTION OF THE PREFERRED EMBODIMENT

Figure 1:
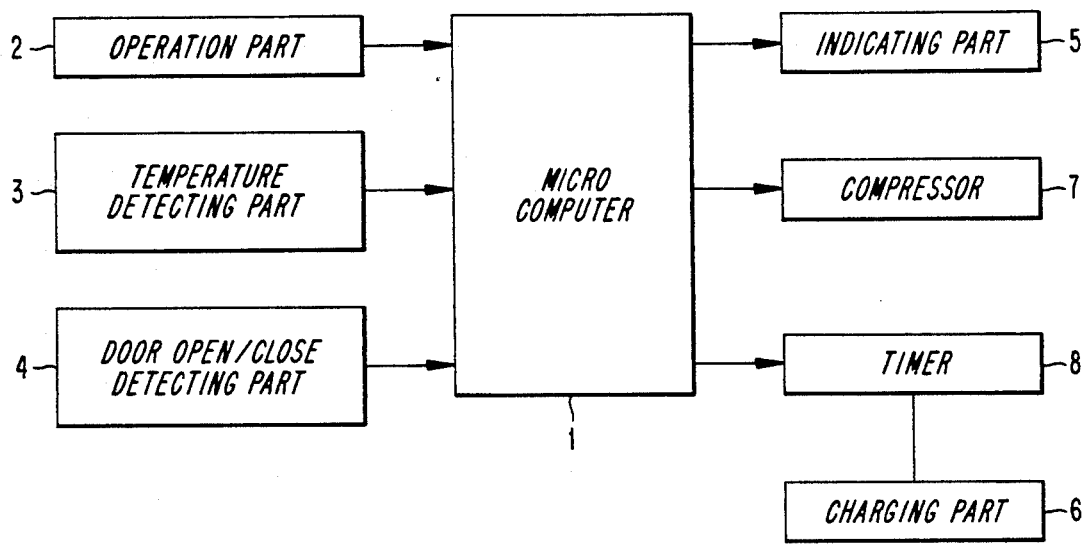
FIG. 1 is a block diagram of the apparatus for an embodiment in accordance with the present invention.
Figure 2:
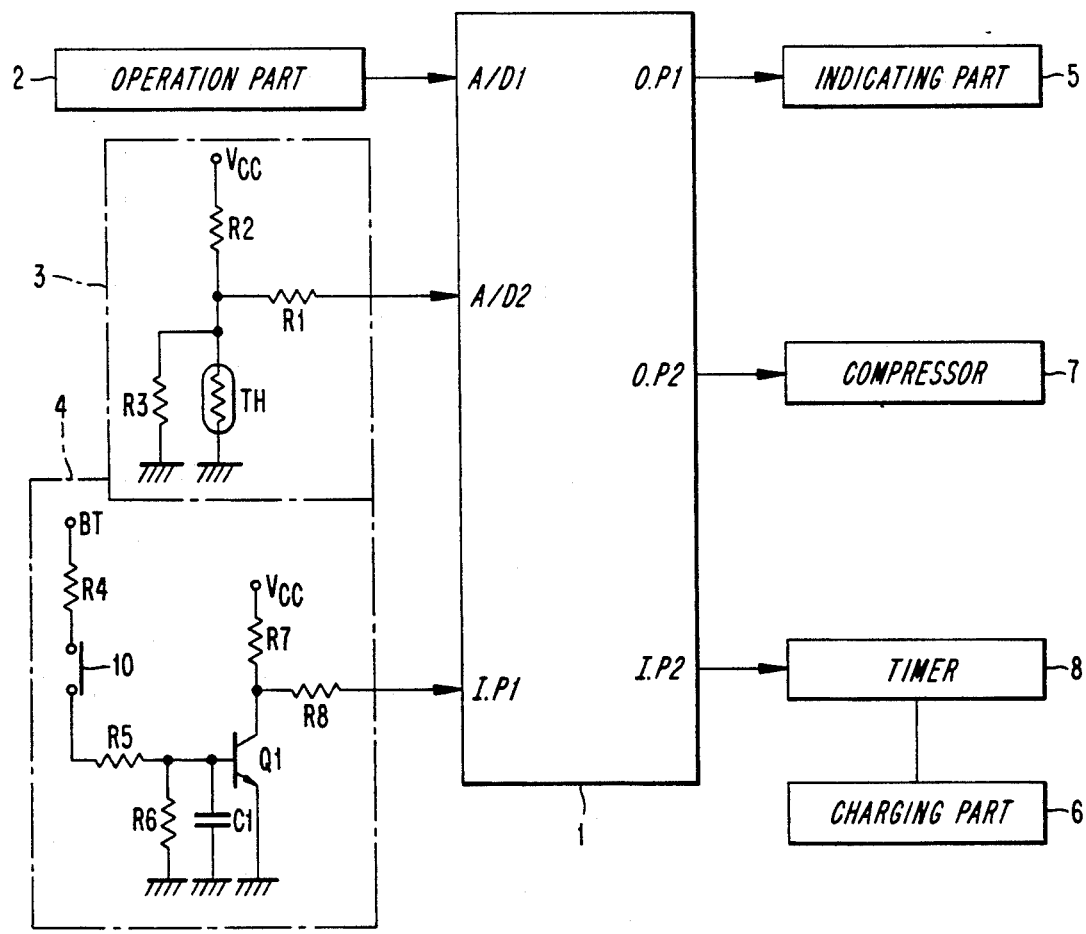
FIG. 2 is a drawing of detailed circuit being applied to the present invention.

In FIGS. 1 and 2, No.1 is a micro computer which generally controls entire system according to the comparison results between the predetermined standard temperature and the changing temperature in the refrigerator detected during a certain period of time.

No.2 is an operation part which inputs into a microcomputer the temperature ranges applicable to respective cool grades, i.e., applicable to a generally-used standard mode of medium-cool or a power-economizing mode of low-cool and the daily operating hours of closed door continuation time.

In this operation part, the temperature ranges, closed door continuation time and switching time to other temperature modes are decided at will by the user according to respective conditions.

Namely, under the temperature ranges, one mode is chosen out of the standard or power-economizing modes, and in the case of closed door continuation time, for instance, if closed door continuation time is given as "an hour" and if standard mode is chosen and when the door is kept closed for over an hour, then temperature ranges are automatically switched to the power-economizing mode of low-cool from the standard mode.

In the case of setting-up of switching time between temperature modes, classified time zones between morning hours when refrigerator opening and/or closing is frequent and small hours when refrigerator opening and/or closing is almost nil are set up. Accordingly, if the mode set up in the morning hours is standard mode of medium-cool, it can be switched from power-economizing mode of low-cool in the small hours.

As described above, the set-up of closed door continuation time and the switching times to other temperatures is made at the operation part. However the counting operation in those time zones is achieved by a timer and switching to standard mode or to power-economizing mode is made by control of the compressor.

No.3 is a temperature detecting part comprising a thermistor whose resistance values so changes according to resistors R1, R2, R3 and a temperature coefficient. Thus, the micro computer 1 can control the driving of the compressor 7 based on the detection results of the detection of the temperature changes in the refrigerator over a certain period of time. The temperature detecting part inputs into the micro computer the data indicating temperature changes inside the refrigerating and freezing chambers detected over a certain period of time.

No.4 is a door open/close detecting part consisting of a micro switch 10, resistors R4, R5, R6, R7, R8, a condenser C1 and a transistor Q1 for inputting the signal of whether the door of a refrigerator is open or closed into the micro computer 1.

No.5 is an indicating part indicating digitally the inner temperatures of the refrigerator detected by the temperature detecting part 3 in accordance with the control of the micro computer 1.

No.6 is a charging part which charges the timer 8 for an automatic temperature adjustment to be performed for the cooling continuation time in accordance with random cooling grades the switching time to other temperature modes not being interrupted and thus being discriminated through the operation of the timer 8 connected to input side I of the micro computer 1 even during the blackout.

As explained above, the plural temperature adjustment apparatus of the refrigerator in accordance with the present invention is made so that the user can freely set up appropriate temperatures supposedly to be maintained according to the standard mode of medium-cool and the energy-efficient mode of low-cool grades and can input the appropriate temperatures to a micro computer 1 thru the operation part 2. When there is no opening or closing operation during a certain period of time with the cooling operation still being processed under certain cool grades, a standard time, i.e., closed door continuation time, is set up in a micro computer 1 so that the temperature can be automatically switched to other cool grades.

Furthermore the cooling by the power-economizing mode is to be set up during a period when there is little frequency of door open/close activity, i.e., a time zone where there is little possibility of causing temperatures in the refrigerator to rise, for instance, a time zone ranging from 11:00 P.M. to 6:00 A.M. the next morning, and the other time zones than the power-economizing mode are to be set up to perform in medium-cool or standard mode, which is to be operated by the timer 8.

As described above, the driving of the compressor 7 is done under the control of the micro computer 1 based on temperatures set up according to respective cool grades inputted through operation part 2, closed door continuation time and switching time to other temperature modes, and the changing temperatures in the refrigerator is perceived by temperature detecting part 3 for a certain period of time.

In other words, the temperature changes are detected by the use of thermistor TH. When the temperature changes are detected by the thermistor, voltages Vcc are distributed by resistors R2 and R3, and the distribututed voltages are inputted into the input terminal $A/D_2$ of a micro computer 1 thru a resistor R1 of electric current limiting purposes and then, transformed to digital data.

Afterwards the temperature changes are compared with standard temperatures which are supposed to be maintained per the respective cool grades set up in the micro computer 1.

Besides, the perceived signals of door open/close detecting part 4 are inputted into a micro computer 1 thru an input terminal I.P1 and if the door is open, the micro switch 10 becomes open subsequently, which causes a high level of signals to be inputted into an input terminal I.P1 as the voltage vcc is not supplied to the base of a transistor Q1, only to be off.

If the door is closed, the micro switch 10 is turned on whereby voltage Vcc causes a transistor Q1 to be turned on through resistors R4, R5, R6 and a condenser C1, thereby low level of signals are supplied to input terminal I.P1.

Namely, the appropriate temperatures in a refrigerator are adequately controlled in accordance with checks on temperature changes in a refrigerator by way of temperature detecting part 3, checks on elapsed time by way of a timer 8 and checks by the door open/close detecting part 4 on whether door is open or closed.

Next, the flow chart of FIG. 3 can be explained as follows in connection with FIG. 1 and FIG. 2 in which the cooling operation performed under the medium-cool of the standard temperature condition is described. However the cooling operation under low-cool of the power-economizing temperature condition is omitted as low-cool is always performed under power-economizing temperature condition.

First of all, the compressor is driven to reduce the temperature in the refrigerator at step S2 when the power is turned on at step S1. The temperature ranges against the respective cooling grades set up by the user's adequate judgement at step S3, that is, the standard temperature ranges of medium-cool. The closed door continuation time and the switching time zones into other temperature modes are inputted into the input terminal A/D₁ of micro computer 1 through operation part 2, and then the standard temperatures and standard time per respective cooling grades are stored as digital data.

Subsequently, whether or not the temperature in a refrigerator has reached the standard temperature ranges of medium-cool at step S4 is perceived by way of signals detected by temperature detecting part 3. The temperature in a refrigerator is then output to indicating part 5 through output terminal O.p, to be indicated in digital form. However when the temperature in the refrigerator does not reach the standard temperature set for medium-cool (in case of "No" at step S4), control is returned to step S2 to cause the temperature in the refrigerator to reach the standard temperature range set for medium-cool by maintaining the present driving status of the compressor 7.

When the temperature in the refrigerator has already reached the set-up temperature of medium-cool (in case of "Yes"at step S4), the operation of the micro computer proceeds to step S5 and discriminates whether or not the door has been opened based on the signals inputted onto input terminal I.P₁ from the door open/close detecting part 4.

The step S5 procedure is to discriminate whether there has been any door open/close operation within the closed door continuation time stored in the micro computer 1, wherein the closed door continuation time is being counted by the counter 8 and judged by the micro computer 1.

In other words, when it is judged at step S5 that the door has been opened(in case of "Yes"), it is determined whether or not the continuation time set up under closed door status (the cooling continuation time, for example, one hour) has elapsed at step S6. If the time has elapsed (in case of "Yes"), the operation of the micro computer proceeds to step S6-1, and controls the compressor driving so that the temperature in the refrigerator is changed to a low-cool set-up value and returns back to step S5.

Of course, if it is discriminated at step S5 that the door has not been opened (in case of "no"), which implies that there is no need of checks on the one hour time lapse, the operation of the micro computer proceeds directly to step 57, It is discriminate whether or not the time has reached a midnight time zone set up by the user's judgement thru operation of the operation part 2 on a certain time of the afternoon, namely a time zone when there is hardly any action of door opening or closing.

The operation of the step S7 is the discrimination by the timer 8 of whether the time has reached the switching time zone toward the low-cool mode wherein low-cool temperature is maintained due to the low frequency of the refrigerator door opening or closing which results in no anxiety of the temperature rising.

If the discrimination result shows that the time has not reached a certain time of the afternoon (in case of "no"), the operation of the micro computer returns to step S2 and re-drives the compressor to a medium-cool of the standard temperature condition. If the time has reached a certain time of the afternoon (in case of "yes"-'in step S7), as the time is within the time zone for less frequency of the refrigerator door opening or closing even though an hour has not passed after the door closure, there is no need for cooling under medium-cool of standard temperature condition. The operation of the micro computer, therefore, proceeds to step S8 and drives compressor 7 to the pre-set low-cool temperature by sending drive control signals to the compressor 7 through output terminal O.P₂ of the micro computer 1.

Subsequently, when a certain time passes after cooling in accordance with low-cool grade, the necessity is discriminated at step S9 of whether the time has reached a certain time of the morning, namely a time when it is necessary to drive in medium-cool temperatures due to temperature increases in the refrigerator caused by a relatively high frequency of the refrigerator door opening and closing.

If the above discrimination results show that the time has reached a certain time of the morning (in case of "yes"at step S9) the compressor 7 is caused to be driven to reach medium-cool temperature ranges of step S11 and then the micro computer operation returns to step S4.

If the time has not reached a certain time of the morning (in case of "no"), the micro computer operation proceeds to step S10 and returns back to step S9, maintaining the present driving status of the compressor 7, and then repeats the next operations again.

Though the foregoing descriptions have classified into medium-cool and low-cool grades, the present invention is not limited to above scopes only. The applications of high-cool and medium-cool, high cool and low-cool or randomly-classified two-step temperatures can be possible in the plural temperature adjustment.

As explained above, the plural temperature adjustment apparatus for a refrigerator in accordance with the present invention causes adequate operation to perform in compliance with cooling temperatures and cooling time set up per respective cooling grades, which prolongs the life time of the compressor, prevents unnecessary consumption of electric power as an economizing effect and maintains temperature adjustment functions as well by the timer operation being possible during blackout by way of charging apparatus.

What is claimed is:

1. A control apparatus for a refrigerator comprising:
   a micro computer;
   an operation part for inputting temperatures and time data necessary for respective cooling grades into said micro computer;
   a timer for counting time lapsed and inputting the time lapses of certain time zones in a morning and an afternoon into said micro computer;
   a temperature detecting part for inputting into said micro computer temperature changes in the refrigerator by detecting the temperature for a certain period of time;
   a door open/close detecting part for detecting whether the door of a refrigerator is open or closed and for generating detection signals which are input into said micro computer; and
   a compressor which is controlled by the signals outputted from said micro computer.

2. The apparatus of claim 1, further comprising an indicating part at an output terminal of the micro computer for indicating temperatures in the refrigerator detected by said temperature detecting part in accordance with the control of said micro computer.

3. The apparatus of claim 1, further comprising an charging part connected to said timer for performing a charging operation which causes the operational function of said timer for automatic temperature adjustment in said refrigerator to be performed during a blackout.

4. The apparatus of claim 2, further comprising a charging part connected to said timer for performing a charging operation which causes the operational function of said time for automatic temperature adjustment in said refrigerator to be performed during a blackout.

5. A control apparatus for a refrigerator having a compressor, a door and at least one chamber, comprising:
   temperature detecting means for detecting temperature changes in the at least one chamber in the refrigerator;
   door detecting means for detecting whether the door is closed;
   timer means for counting elapsed time of continuous closed door status;
   means for storing operation mode data for at least two operation modes; and
   control means for controlling operation of the compressor to operate the refrigerator in one of the at least two operation modes responsive to the temperature detecting means, the door detecting means, the timer means and the storing means.

6. The apparatus of claim 5, further comprising an operation part for inputting the stored operation mode data, the data comprising time zones during a 24 hour period and corresponding temperatures of operation.

7. The apparatus of claim 5, wherein the mode data comprises a power-economizing mode for operation of the refrigerator during hours of relatively infrequent door opening and a standard mode for operation of the refrigerator during hours of relatively frequent door opening.

8. The apparatus of claim 5, wherein the means for storing stores a closed door continuation time and the control means changes operation modes if the closed door continuation time has elapsed.

9. The apparatus of claim 5, further comprising indicating means for indicating temperatures in the at least one chamber of the refrigerator detected by the temperature detecting means.

10. The apparatus of claim 5, further comprising charging means connected to the timer means for charging the timer means for maintaining operation of the temperature control apparatus during a blackout.

11. A method of controlling temperatures in a refrigerator having a compressor, a door and at least on chamber, comprising:
   storing operation mode data for at least two operation modes in a computer means, the mode data including time zones in a 24 hour period and corresponding operating temperatures;
   detecting temperature changes in the at least one chamber in the refrigerator;
   detecting whether the door is opened;
   counting elapsed time of continuous closed door status;
   controlling operation of a compressor to operate the refrigerator in one of the at least two operation modes responsive to detecting the temperature changes, detecting opening of the door and the lapsing of the continuous closed door time.

12. The method of claim 11, wherein the mode data includes a power-economizing mode for operation of the refrigerator during hours of relatively infrequent door opening and a standard mode for operation of the refrigerator during hours of relatively infrequent door opening.

13. The method of claim 11, wherein a closed door continuation time is stored and the operation mode is changed if the closed door continuation time has elapsed.

* * * * *